US009648907B2

(12) United States Patent
Kobal et al.

(10) Patent No.: US 9,648,907 B2
(45) Date of Patent: May 16, 2017

(54) VIRTUAL REALITY SMOKING SYSTEM

(75) Inventors: Gerd Kobal, Sandy Hook, VA (US);
Henry Dante, Midlothian, VA (US);
Rangaraj Sundar, Midlothian, VA (US); Peter Lipowicz, Midlothian, VA (US); William R. Sweeney, Richmond, VA (US); Ashok Solanky, Mechanicsville, VA (US)

(73) Assignee: Philip Morris USA Inc., Richmond, VA (US)

(*) Notice: Subject to any disclaimer, the term of this patent is extended or adjusted under 35 U.S.C. 154(b) by 930 days.

(21) Appl. No.: 11/319,784

(22) Filed: Dec. 29, 2005

(65) Prior Publication Data

US 2007/0006889 A1 Jan. 11, 2007

Related U.S. Application Data

(60) Provisional application No. 60/685,656, filed on May 31, 2005.

(51) Int. Cl.
*A24F 47/00* (2006.01)
*G06T 19/00* (2011.01)
*G06T 19/20* (2011.01)
*G06T 13/60* (2011.01)

(52) U.S. Cl.
CPC ............ *A24F 47/002* (2013.01); *G06T 13/60* (2013.01); *G06T 19/006* (2013.01); *G06T 19/20* (2013.01)

(58) Field of Classification Search
None
See application file for complete search history.

(56) References Cited

U.S. PATENT DOCUMENTS

| 1,694,603 | A | * | 12/1928 | Piagneri | ................ | 131/178 |
| 5,042,510 | A | | 8/1991 | Curtiss et al. | | |
| 5,322,075 | A | | 6/1994 | Deevi et al. | | |
| 5,414,544 | A | * | 5/1995 | Aoyagi et al. | ................ | 349/13 |

(Continued)

FOREIGN PATENT DOCUMENTS

JP   2000-353248 A   12/2000
JP   2003-103045 a    4/2003

(Continued)

OTHER PUBLICATIONS

Bordnick, P.S. et al., "Utilizing virtual reality to standardize nicotine craving research: A pilot study", Addictive Behaviors, Pergamon Press, Oxford, GB, vol. 29, No. 9, Dec. 2004, pp. 1889-1894.

(Continued)

*Primary Examiner* — Michael J Felton
(74) *Attorney, Agent, or Firm* — Buchanan Ingersoll & Rooney PC

(57) ABSTRACT

A virtual or augmented reality smoking system is provided herein. A smoker using the system can experience a virtual reality of smoking by puffing on a cigarette shaped article and experiencing the taste or aroma from the article while simultaneously viewing a generated image of a burning cigarette and exhaled and sidestream smoke. Additionally, the room environment may be simulated to give the experience of smoking in a setting of the smoker's choice (virtual reality) or the image of a burning cigarette and smoke may be superimposed on a live or natural image of the smoker's environment (augmented reality).

16 Claims, 6 Drawing Sheets

(56) References Cited

U.S. PATENT DOCUMENTS

| | | |
|---|---|---|
| 5,591,368 A | 1/1997 | Fleischhauer et al. |
| 5,692,525 A | 12/1997 | Counts et al. |
| 5,934,289 A | 8/1999 | Watkins et al. |
| 6,026,820 A | 2/2000 | Baggett, Jr. et al. |
| 6,053,176 A | 4/2000 | Adams et al. |
| 6,169,595 B1 | 1/2001 | Manne |
| 6,175,343 B1 | 1/2001 | Mitchell et al. |
| 6,243,491 B1 | 6/2001 | Andersson |
| 6,325,475 B1 | 12/2001 | Hayes et al. |
| 6,500,008 B1 | 12/2002 | Ebersole et al. |
| 6,606,998 B1 | 8/2003 | Gold |
| 6,690,338 B1 | 2/2004 | Maguire, Jr. |
| 6,752,498 B2 | 6/2004 | Covannon et al. |
| 6,760,026 B2 | 7/2004 | Li et al. |
| 6,790,496 B1 | 9/2004 | Levander et al. |
| 6,822,648 B2 | 11/2004 | Furlong et al. |
| 6,847,336 B1 | 1/2005 | Lemelson et al. |
| 6,854,470 B1* | 2/2005 | Pu .................. 131/273 |
| 7,538,782 B2 | 5/2009 | Kuroki et al. |
| 8,223,015 B2 | 7/2012 | Yuuki |
| 2002/0179101 A1 | 12/2002 | Chavez |
| 2003/0227470 A1* | 12/2003 | Genc et al. .................. 345/633 |
| 2004/0003820 A1 | 1/2004 | Iannuzzi |
| 2004/0104935 A1 | 6/2004 | Williamson et al. |
| 2004/0131232 A1 | 7/2004 | Meisner et al. |
| 2005/0179617 A1* | 8/2005 | Matsui et al. .................. 345/7 |

FOREIGN PATENT DOCUMENTS

| | | |
|---|---|---|
| JP | 2003-244726 A | 8/2003 |
| JP | 2003-250509 A | 9/2003 |

OTHER PUBLICATIONS

Pollini, L. et al., "A Synthetic Environment for Dynamic Systems Control and Distributed Simulation", IEEE Signal Processing Magazine, IEEE Service Center, Piscataway, NJ, vol. 20, No. 2, Apr. 2000, pp. 49-61.

Chu et al., "Alliance, Technology, and Outcome in the Treatment of Anxious Youth", Cognitive and Behavioral Practice, Association for Advancement of Behavior Therapy, NY, vol. 11, No. 1, Jan. 2004, pp. 44-55.

International Search Report and Written Opinion dated Apr. 27, 2007 for PCT/IB2006/002870.

Official Action for corresponding Japanese Patent Appin. No. 2008-514232.

* cited by examiner

VIRTUAL REALITY SMOKING SYSTEM

CROSS-REFERENCE TO RELATED APPLICATIONS

The present application claims priority under 35 U.S.C. 119 to U.S. Provisional Patent Application No. 60/685,656 filed on May 31, 2005, the entire content of which is hereby incorporated by reference.

BACKGROUND

The present invention relates generally to systems which imitate the physical and/or sensorial pleasures of smoking.

SUMMARY

Provided herein is a virtual or augmented reality smoking system which provides smoking sensations, such as the taste, feel, aroma and visual experiences of smoking a tobacco product (or smoking article), such as a cigarette, but without an actual smoking or burning of tobacco.

As provided herein, an imitation smoking experience is provided by a virtual or augmented reality smoking system, which includes a device with the shape, weight, feel and resistance to draw (RTD) of a smoking article, additives in the device, and a virtual or augmented reality display.

Also provided herein is a virtual or augmented reality, visual simulation that can also be provided in order to immerse a smoker into a virtual smoking experience. The virtual or augmented reality visual simulation can be provided by an image generating device that generates an image of a lit smoking article, such as a cigarette, and/or exhaled smoke therefrom, wherein a computer is also provided with software to generate these virtual or augmented reality images. By providing a system with a virtual or augmented reality simulation along with an unsmokeable model of a smoking article, such as a cigarette, a smoker can be provided with a substitute virtual smoking experience similar to an actual smoking experience without the actual smoking or burning (combustion) of tobacco.

Also provided herein is a method of using a virtual or augmented reality smoking system, wherein a smoker experiences a virtual reality of smoking by viewing a generated image of a smoldering tobacco product and/or the smoke therefrom, as well as tasting a simulated smoke taste as desired.

Also provided herein is a virtual or augmented reality smoking system, comprising: a model of a smoking article; an image generator; and a viewing device, wherein the viewing device is capable of displaying images from the image generator responsive to a drawing action upon or a physical handling of the model of the smoking article.

Also provided herein is a method of virtual or augmented reality smoking, comprising: providing a smoking implement shaped device; providing an image generator; providing a viewing device; and simulating smoking of a smoking implement within the viewing device using the image generator.

Also provided herein is a smoking implement shaped device, comprising: a hollow cylindrical device; a releasable flavorant within the hollow cylindrical device; airflow controllers within the hollow cylindrical device; and a sensor on the hollow cylindrical device.

Also provided herein is a virtual or augmented reality display, comprising: two curved projection surfaces; and a laser beam projector.

DETAILED DESCRIPTION

As used herein, "smoking articles" is intended to include articles which include smokeable material (tobacco), such as cigarettes, cigars and pipes.

Figure 1:
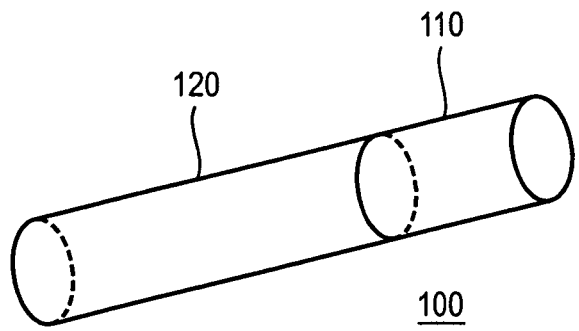
FIG. 1 illustrates a conventional cigarette with a tobacco rod and a filter.

Referring to FIG. 1, a conventional cigarette 100 typically comprises a tobacco rod portion 120, and a filter portion 110 which is also referred to as a filter tipping. Typically, tipping paper 122 is used to attach the filter tipping with the tobacco rod 120. The tobacco rod 120 includes a paper wrapper 124 in which shreds of tobacco are wrapped. A line of adhesive holds overlapping edge portions of the paper wrapper together to form a seam 126. The tobacco rod 120 has a first end, which is integrally attached to the filter portion 110 and a second end which is lit or heated when smoking the cigarette 100. During smoking, smoke is drawn from the lit end to the filter portion end of the tobacco rod 120 and further downstream through the filter portion 110.

"Smoking" of a cigarette is intended to mean the heating, combusting or otherwise causing a release of smoke or aerosol from a smokeable material such as tobacco. Generally, smoking of a cigarette involves lighting one end of the cigarette and drawing the smoke downstream through the mouth end of the cigarette, while the tobacco contained therein undergoes combustion, pyrolysis or release of volatiles. However, a cigarette may also be smoked by other means also included in the term "smoking." For example, a cigarette may be smoked by heating the cigarette using a combustible heat source, whose thermal output is used to volatilize tobacco flavors during a draw upon the smoking article, as described, for example, in commonly-assigned U.S. Pat. Nos. 6,053,176; 6,026,820, 5,934,289; 5,591,368 or 5,322,075, each of which is incorporated herein by reference in its entirety.

In order to accurately simulate human action within a virtual environment, virtual reality systems aim to facilitate input and output of information representing human senses. In many situations, among all the human senses, sight (or visual input) is useful as an evaluative tool. Accordingly, a display system for visualization is preferably part of a virtual reality system.

"Virtual or augmented reality" is intended to mean a visual simulation that creates a virtual or augmented visual environment. As used herein, the term "virtual reality" is intended to include simulated images, which are generated for visualization by a smoker and can include a partially or completely simulated environment. Also, as used herein, the term "augmented reality" is intended to include a combination of simulated images used to augment a real or "live" environment, wherein live images are used in combination with simulated images, which are overlaid on the live images. As a result of using virtual or augmented reality, simulated virtual images can be provided or live visual images can be augmented with simulated augmented images to form an interactive environment that can look and feel like reality.

Visualization in virtual or augmented reality systems can be accomplished by means of a head-mounted display (HMD) worn on a smoker's head with a viewing display mounted in front of the smoker's eyes. Additionally, a camera if desired can be incorporated in a HMD for gathering live visual information of the smoker's actual environment, wherein the live information from the camera can be used as a base environment in virtual and/or augmented reality systems. Exemplary virtual reality components, such as HMDs can be provided by Virtual Realities, Inc. of Galveston, Tex.

In a virtual or augmented reality smoking system, a smoker can experience a virtual reality of smoking by puffing on a (preferably unlit) smoking article or a model of a smoking article. Optionally, the model can include a flavor release mechanism so that the virtual smoker can inhale from the model and experience a simulated taste or aroma of tobacco while simultaneously viewing a generated virtual image of a smoldering smoking article along with other virtual images, such as smoke being exhaled and alternatively, sidestream smoke being emitted. Additionally, a smoker's environment may also be provided with simulated or virtual images to give the experience of smoking in a setting of the smoker's choice (virtual reality), such as at a home-setting, a lounge of a cigar-store or the like. Alternatively, the image of a smoking article can have a virtual image of a burning tip or smoke superimposed on a live or natural image of the smoker's environment so as to produce an augmented reality (by way of example).

Figure 2:
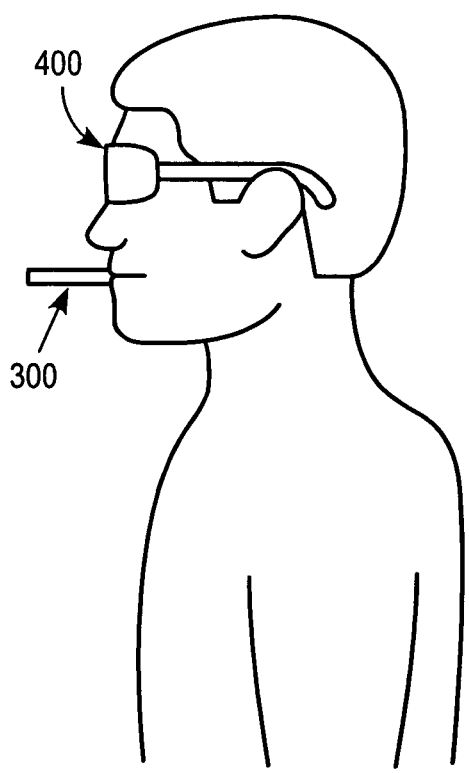
FIG. 2 illustrates an embodiment of an exemplary virtual or augmented reality smoking system.

Referring to FIG. 2, an overview of an exemplary virtual or augmented reality smoking system 200 is illustrated. In the exemplary virtual or augmented reality smoking system 200 of FIG. 2, the system includes a cigarette model 300 which has the dimensions and appearance of a traditional, lit-end cigarette (it is noted that the "cigarette model" is merely exemplary and can be substituted with a model of any smoking article, such as a cigar, pipe, etc.), a HMD 400, and a computer system 500. In the exemplary embodiment, the system 200 allows a smoker to interact with his surrounding environment including the cigarette model 300 (or unlit real cigarette), wherein the computer monitors the interaction of the smoker with the model 300, creates a virtual or augmented image including an image of a cigarette that is mimicked by the model 300, and displays a virtual or augmented image of the smoker interacting with the model 300 through the HMD 400.

Figure 3:
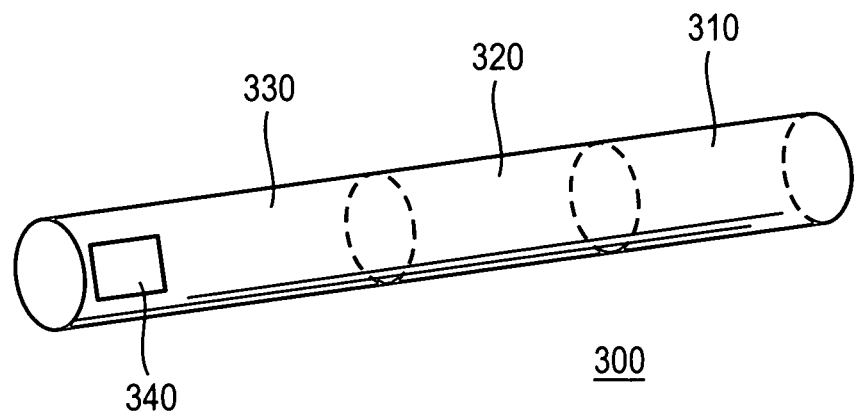
FIG. 3 illustrates an exemplary model of a smoking article of the virtual or augmented reality smoking system.

Referring to FIG. 3, an exemplary cigarette model 300 is provided with a filter portion 310, which is preferably similar to a conventional filter tipping of a cigarette. The filter portion 310 preferably provides a resistance to draw (RTD) similar to a conventional cigarette. For example, the filter material of the filter may be any of the variety of fibrous materials suitable for use in tobacco smoke filter elements. Typical fibrous materials include cellulose acetate, polypropylene or paper. Preferably, the filter material is cellulose acetate.

Alternatively or additionally, the filter portion 310 includes additives, such as releasable flavorants and/or aromas to provide a smoker with experiences of taste and/or smell sensations in addition to the visual sensations. Additionally, the additives can be provided anywhere in the model 300, such as a midsection portion 320 or at a "lit end" portion 330 depending on desired properties, ease of manufacture, additive concentration, etc.

In an exemplary embodiment, the additives may include one or more releasable flavorants or aromas, such as liquid or solid flavorants or aromas or flavorant/aroma-containing materials. The terms "flavorant" and "aroma" may include any flavorant compound or aroma, such as tobacco extracts or volatile flavor compounds, that can be released when drawn through the cigarette model 300.

Suitable flavorants and aromas include, but are not limited to, any natural or synthetic flavor or aroma, such as tobacco, smoke, menthol, mint, such as peppermint and spearmint, chocolate, licorice, citrus and other fruit flavors, gamma octalactone, vanillin, ethyl vanillin, breath freshener flavors, spice flavors such as cinnamon, methyl salicylate, linalool, bergamot oil, geranium oil, lemon oil, ginger oil, and tobacco flavor.

The exemplary cigarette model 300 preferably includes a sensor 340, which can be used to sense the position and motion of the model 300, as well as air flow direction and force within the model 300. For example, if a cigarette model 300 is placed in a smoker's mouth, the sensor 340 can be used to sense the position of the cigarette model 300, as well as the path of movement by which the smoker moved the cigarette model 300 and transmit signals indicative of same to a monitor.

Additionally, the sensor 340 can be adapted to detect air flow and force of air passing through the lumen of the cigarette model 300 to determine whether a smoker has drawn on the cigarette model 300 and with how much force (how deeply). A flow sensor, such as disclosed in U.S. Pat. No. 5,692,525, which is incorporated herein in its entirety, may be used to execute this draw-sensing function.

An exemplary sensor 340 that can be used in this embodiment of the system 200, preferably includes a transmitter by which data from the sensor can be transmitted to a computer 500 within the system 200. For instance, one or more sensors can be used to detect movement of the model 300 and a draw on the model 300 by a smoker. Exemplary sensors can be provided by Virtual Realities, Inc. of Galveston, Tex.

It is noted that by providing a sensor 340 at a lit end of the cigarette model 300, as illustrated in FIG. 3, the movement of the lit end of the cigarette shaped model 300 can be closely monitored and tracked. It is noted that the use of a single sensor 340 positioned at the lit end is only one embodiment and that the sensor 340 can be embodied by more than one sensor that can be positioned within more than one portion of the cigarette model 300 as desired.

Figure 4A:
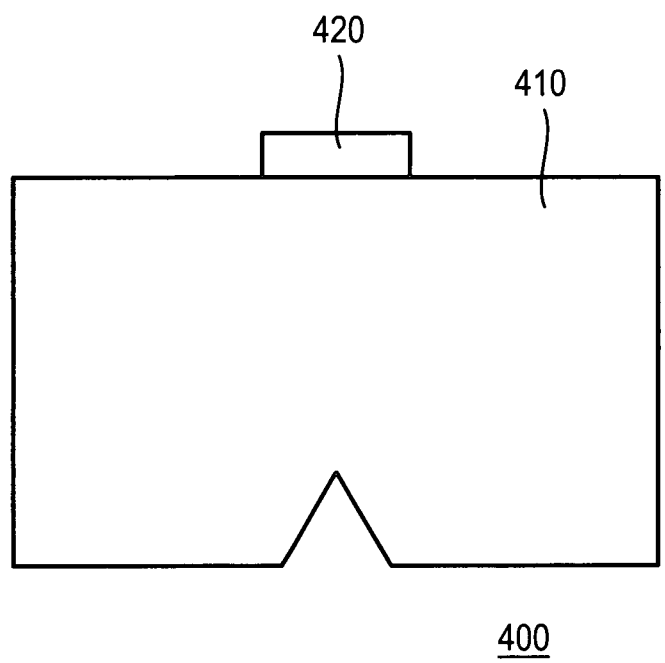
FIG. 4A illustrates an exemplary viewing device of a virtual or augmented reality smoking system.

An exemplary HMD 400 is illustrated in FIG. 4A. Preferably, the HMD 400 includes a viewing device 410 and a camera 420, wherein the camera 420 can be used to gather visual data from the live environment in front of the HMD 400 for use in displaying the virtual or augmented reality environment through the viewing device 410 to the smoker. The camera 420 can be used to provide the background for an augmented reality in conjunction with a computer to superimpose simulated images on the camera's images in the viewing device 410.

Figure 4B:
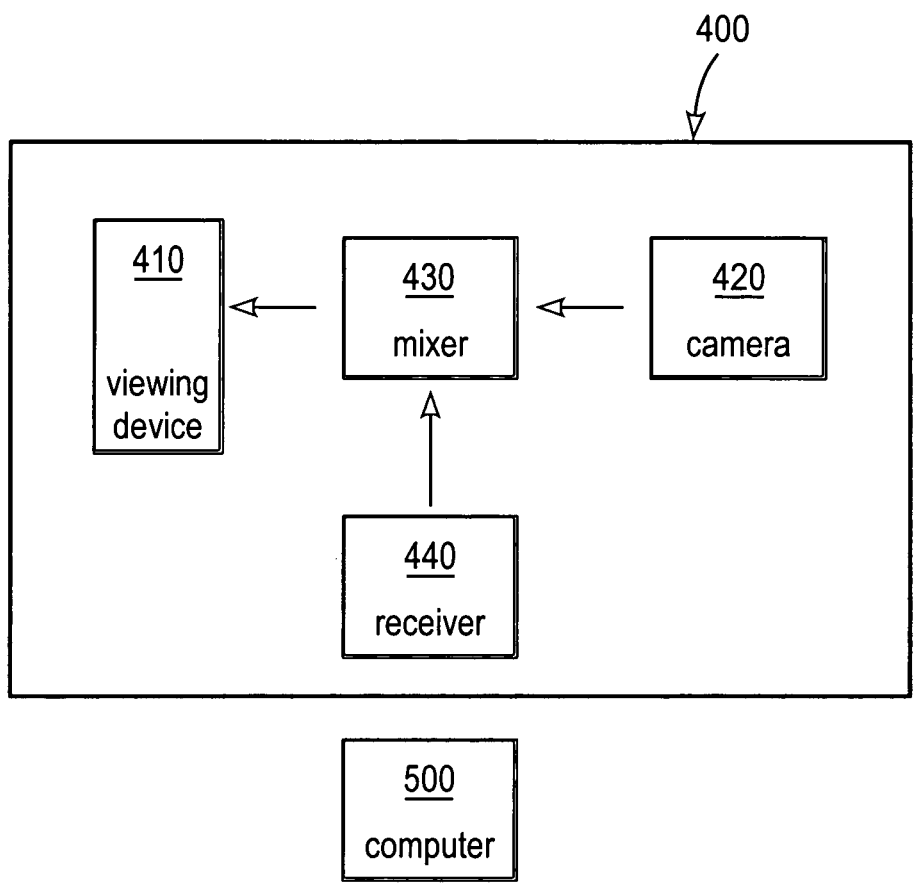
FIG. 4B is an exemplary diagram for using a viewing device of the virtual or augmented reality smoking system.

A virtual or augmented reality environment, as illustrated in FIG. 4B, can be formed by mixing the live environment gathered and transmitted to a mixer 430 from the camera 420 with a virtual or augmented reality environment created by a computer system 500. The environment created by the computer system can be transmitted to a computer image receiver 440 in the HMD 400, which in turn can transmit the virtual or augmented reality environment to the mixer 430. The mixer 430 can then overlay the virtual or augmented reality environment from the computer image receiver 440 onto the live environment or portions of the live environment from the camera 420. Then, the mixer 430 can transmit the combined live and virtual or augmented reality environment through the viewing device 410 for perception by a smoker of the viewing device 410.

For example, in an augmented reality system, the mixer 430 can be used to overlay only a virtual image of sidestream smoke being emitted from the cigarette model 300 on to the live image of the model 300 while leaving the majority of the live image environment unchanged. Thus, only a small part of the visualized environment would be simulated or "virtual." On the other hand, in an exemplary virtual reality system, the mixer 430 can use a simulated virtual environment provided by a computer for a majority of the visualized environment, such as the scenery and/or objects, and wherein images from the camera 420 can be used to manipulate items in the simulated environment, such as the cigarette model 300.

Figure 4C:
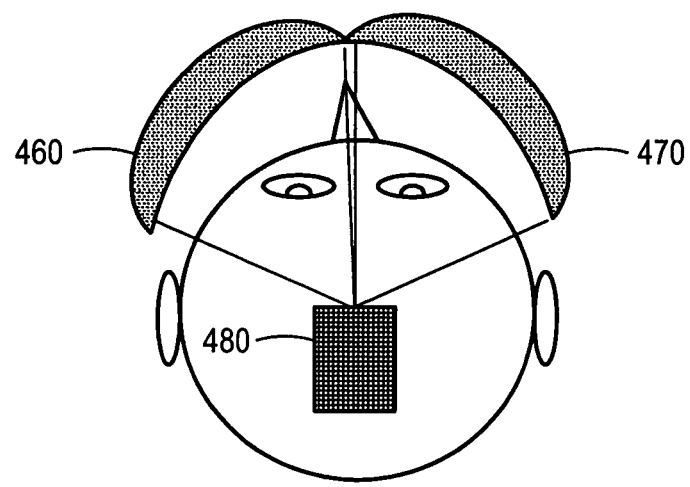
FIGS. 4C and 4D illustrate a top view and a side view, respectively, of an exemplary surround view device.
Figure 4D:
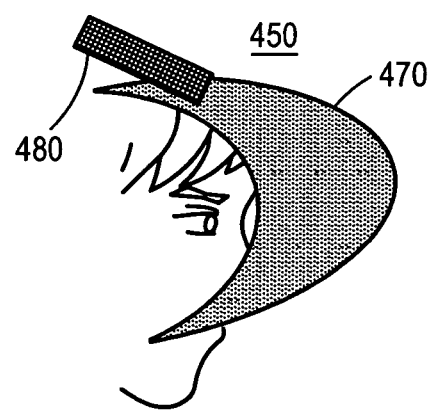

In an exemplary HMD, a surround view device can be provided. As illustrated in FIGS. 4C and 4D, a surround view device 450 can include two projection surfaces (one for each eye) 460, 470, wherein a projection from a projector 480 can be projected upon the surfaces 460, 470 to provide a stereoscopic image.

The projection surfaces 460, 470, as illustrated in FIGS. 4C and 4D, can be shaped into smoothly curved surfaces. These smoothly curved surfaces can be shaped through mathematical coding to provide surfaces which correspond to a digital processor so that the projection from the projector automatically forms incoming two dimensional images into a surround visual mode. For example, as illustrated in FIGS. 4C and 4D, the smoothly curved projection surfaces 460, 470, appear as a dual-lobed device, wherein the surfaces appear smoothly and intentionally warped. Thus, by using a device with smoothly curved projection surfaces (along with a digital processor), rather than flat screens in a visual plane, non-rectilinear images can be viewed.

The projector 480 can project illumination or laser images against the projection surfaces 460, 470 to form a virtual or augmented reality image. If opaque or semi-transparent projection surfaces 460, 470 are provided, standard light projection, similar to those used for movies, projection televisions, etc., can be used. If an augmented reality image is desired, laser images may be preferable in order to provide further overlay qualities. For example, a coaxial tri-color laser beam projection device can be provided by Symbol Technologies, Inc. based in Holtsville, N.Y., to provide the size and visual attributes desired in exemplary device 450.

The projector 480 can be placed separate from projection surfaces of a HMD 400. For example, as illustrated in FIGS. 4C and 4D, the projector can be attached to a top portion of a smoker's head, rather than within the HMD 400 (as illustrated in FIG. 4A). By placing the projector separate from the projection surfaces, the portion of the device being supported by portions of the face can be made lighter and thus may be more comfortable.

Additionally, splitting prisms, mirrors, or other elements can also be provided within the device 450, such that a single projector can simultaneously provide stereo imagery to both eyes by spreading the image out in a pair of projection surfaces 460, 470. For example, a splitting prism can be provided attached to the projector 480 for use with the device 450 as illustrated in FIGS. 4C and 4D. The image can thus "surround" in either or both the vertical and horizontal axis of vision.

The projection surfaces can be screens, which can be opaque for virtual reality or clear/semi-transparent for augmented reality. If non-opaque screens are used, the viewed image can be externally viewable as well, thus others can share in the visual experiences of the user if desired.

In an exemplary embodiment, a photochromic material sensitive to specific wavelengths can be incorporated into a transparent screen to create a complex, dynamically shaped, spatial light modulator. Laser color, intensity, and dwell time can be changed in localized areas of the screen to exceed a threshold for photochromic effects, thus creating dynamic reflective, non-transparent areas in the screen. These shapes can have the effect of blocking out areas of vision so that virtual images can be substituted for overlaid augmented imagery at any point in the field of view to provide dynamic windowing of virtual or overlaid imagery. Thus, by allowing dynamic windowing of a virtual or overlaid imagery, opaque computer generated imagery can be inserted into a virtual display or fixed overlay of computer generated imagery or a see through screen.

Additionally, a non-visible laser, such as an infrared (IR) or ultraviolet (UV) laser, can be provided in a coaxial laser projector (e.g., as part of the projector 480, if desired) to energize photochromic materials. Also, an IR or UV blocking filter can be inserted between the surface and the eye to isolate the eye from exposures to potentially harmful IR or UV light, if higher intensities for activating a given photochromic material are used.

Figure 5:
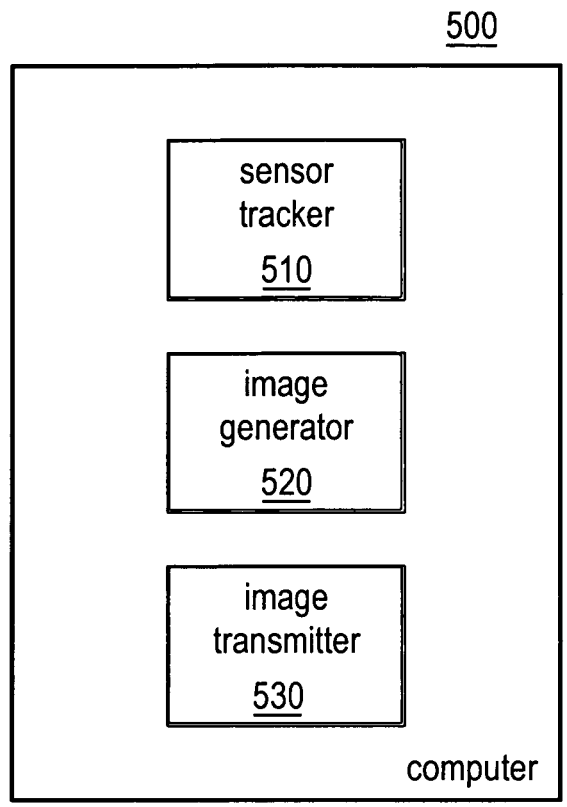
FIG. 5 is an exemplary diagram illustrating a computer of the virtual or augmented reality smoking system.

In order to provide a virtual or augmented reality environment, a computer 500, as illustrated in FIG. 5, can include a sensor tracker 510, an image generator 520 and an image transmitter 530. By using a sensor tracker 510 in conjunction with an image transmitter 530, items, such as the cigarette model 300, can be moved within the live environment and the virtual or augmented reality environment simultaneously to provide a realistic simulation.

The virtual or augmented reality can be created by using a sensor tracker 510 to gather data transmitted from a sensor 340 on a cigarette model 300 regarding the position and movement of the cigarette model 300, as well as air flow direction and volume passing over the sensor 340. By tracking the position, movement and air flow information, any movements of the cigarette model 300 can be incorporated into the virtual or augmented reality environment.

The incorporation of the sensor information into the virtual or augmented reality environment can be accomplished by using an image generator 520, wherein the calculations for forming the virtual or augmented reality environment can incorporate information from the sensor tracker 510. Thus, through the combined use of the sensor 340, the sensor tracker 510 and the image generator 520, a virtual or augmented image can be formed, positioned and superimposed within a live environment for viewing by a smoker.

The sensor 340 can operate based on any number of the following principles: electromagnetic, optical (video-metric), ultrasonic, mechanical linkage, gyroscopes, and accelerometers, etc. For example, microphones, tilt switches, proximity sensors, motion angle sensors, etc. can be used with the system.

The sensor 340 can be used individually or in combination with other sensors 340 in order to provide additional data to the computer 500 controlling the creation of the virtual or augmented reality visualization. The sensor 340 is preferably a low latency, high accuracy measuring device as to the position and orientation of the items in the system. Sensors, as used within the system, can be placed on one or more of the HMDs, projectors, shutter glasses, display systems, cigarette models, projection surfaces, etc.

The computer 500 can also include an image transmitter 530, which can transmit the virtual or augmented reality environment to the viewing device 410. Preferably, the image transmitter is wireless and can use any wireless technology to transmit the virtual or augmented reality environment onto the live environment for mixing and viewing in the viewing device 410.

Figure 6:
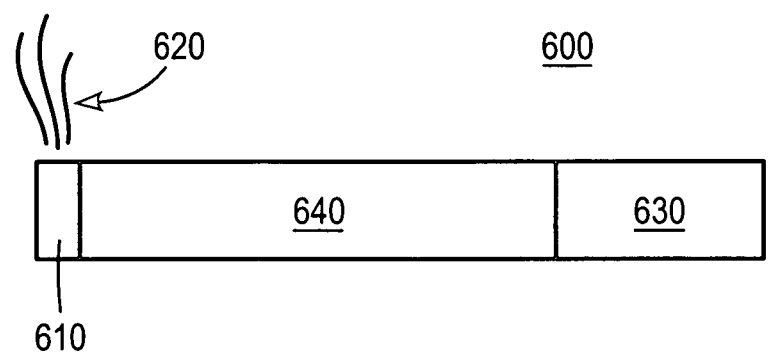
FIG. 6 illustrates an exemplary augmented reality cigarette as viewed when using the virtual or augmented reality smoking system.

In one embodiment, the system 200 can be used to provide an augmented cigarette model 600 (FIG. 6) for virtual smoking. By using the system 200, a smoker could visualize an augmented cigarette model 600 with a virtual image of a burning tip 610 superimposed on a cigarette model 300 (to appear as a burning cigarette) through a viewing device in a virtual or augmented reality environment, as illustrated in FIG. 6. Also, in such a device, rather than superimposing a burning tip 610, a light emitting diode (LED) can be provided at the end of the cigarette model, wherein the LED can also be controlled within the system 200 to vary the intensity of the emission as desired.

Figure 7:
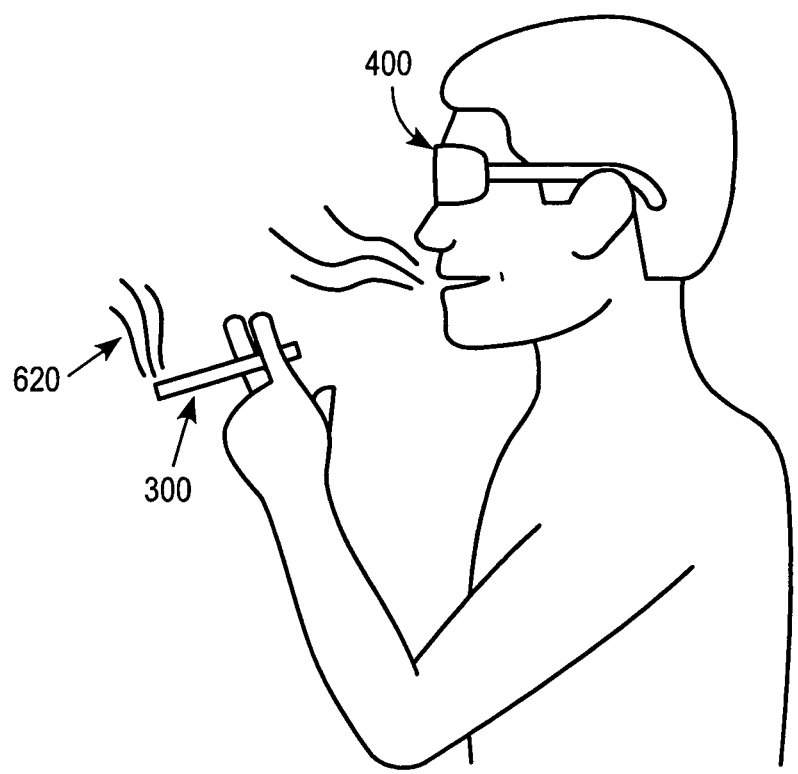
FIG. 7 illustrates an embodiment of an exemplary virtual or augmented reality smoking system.

Alternatively or additionally, a virtual image of an exhalation of smoke 700, as illustrated in FIG. 7, can be provided (to visualize a smoke puff). Alternatively or additionally, a virtual image of a sidestream smoke emission 620, as illustrated in FIG. 6 can be provided (to visualize a burning cigarette) through a viewing device in a virtual or augmented reality environment.

For example, if a sensor 340 in a cigarette model 300 determined that a smoker was inhaling on the cigarette model 300, an image generator 520 could generate a virtual image of a red burning tip 610 to simulate an inhalation on a conventional cigarette, wherein the burning tip 610 could be located wherever the lit end of the augmented cigarette model 600 was located as determined by the sensor 340. Alternatively, the red burning tip 610 can be provided by light emitting devices, such as light emitting diodes (LEDs), which can be activated during a "smoking session," wherein the intensity of the glow can be controlled by a puffing profile to provide a realistic experience. It is noted that the virtual image of a red burning tip 610 can also be controlled as to its intensity of glow to reflect a puffing profile.

Sidestream can also be provided for visualization similar to a sidestream smoke pattern from a burning cigarette. The pattern and characteristics of the sidestream smoke would be different from exhaled smoke, and could be controlled such as to reflect ambient conditions in a room, such as airflow, temperature, etc., as measured or sensed by sensors in the system, if desired.

As another example, if a sensor 340 determined that a smoker was exhaling by determining that the model 300 has been moved away from the smoker's mouth after an inhalation, the image generator 520 could generate a virtual image of an exhalation of smoke 700, which could be located in front of the HMD 400. As yet another example, if a sensor 340 determined that there was neither an inhalation nor an exhalation, the image generator 520 could generate a virtual image of a sidestream smoke emission 620, wherein the sidestream smoke emission 620 could be located wherever the lit end of the augmented cigarette model 600 was located as sensed by the sensor.

In addition to providing an augmented cigarette model 600 with virtual images, such as the burning end or smoke discussed above, the virtual or augmented smoking system 200 can also allow for the environment in which the smoking system 200 is used to be altered or substituted. For example, if a smoker is using the system 200 is a closed room setting, the system 200 can be used to alter the closed room by adding windows with an outdoor view. Or, as another example, the system 200 can be used to substitute a beach environment for the closed room. Thus, a smoker using the system 200 can be virtually smoking a cigarette on a beach even though the smoker is using the system in a closed room.

For example, in order to visualize smoke in a realistic manner, inhalation, exhalation and puffing instances, which include durations, puff volumes, and profiles, can be provided to a system for virtual or augmented reality smoking. Microphones, puff detectors, and flow sensors to detect the various parameters can be used. For example, microphones can be used to detect inhalation and exhalation sounds, and this data along with the signal from a puff detector can be used to identify inhalation and exhalation instances as well as normal breathing. Thus, this data can also be used to derive puff volume and drive the visualization for the system. Additionally, multiple microphones and combination of signals from different sensors can be used to provide accuracy to the parameters for smoke visualization.

Additionally, a projection based system, which can include a large screen back or front projector, can be used to provide an active or passive system. An exemplary projection based system can be set up like a movie theatre, and can be used to serve multiple users by providing a real life "smoking lounge" experience.

Alternatively, a desktop environment can be provided if desired. In order to provide an immersive visualization system in a desktop environment, screen magnifiers or optical magnifiers can be used as an alternative to portable HMD based systems.

The size of the projection surfaces can vary depending upon the application desired. For example, if the system includes a large screen projector, the screen for the large screen projector can be greater than two square feet, such as the size of a television screen, a movie projector screen, or one or more walls in a room. Alternatively, if the system includes a portable viewing device, such as a HMD, the projection surface should be much smaller, for example, a projection surface on the order of less than about one square foot or even less than about a square inch can be used. Thus, projection surfaces can be quite small for applications, such as video games, or large for applications such as "smoking lounges."

Variations and modifications of the foregoing will be apparent to those skilled in the art. Such variations and modifications are to be considered within the purview and scope of the claims appended hereto.

The invention claimed is:

1. A virtual or augmented reality smoking system, comprising:
   a smoking implement shaped device;
   an image generator which generates images of a virtual or augmented reality environment;
   a viewing device receiving images from the image generator, a movement sensor in the smoking implement shaped device which transmits data corresponding to position and motion of the smoking implement shaped device;

a movement sensor tracker coupled to the movement sensor and the image generator, wherein the image generator is capable of producing an image based upon information provided to the image generator from the movement sensor tracker, a camera operative to record live images of a live environment in front of the viewing device, and a mixer which overlays the live images with the virtual or augmented reality environment and transmits a combined live and virtual or augmented reality environment to the viewing device, wherein the viewing device is capable of displaying images of the combined live and virtual or augmented reality environment from the image generator in conjunction with the smoking implement shaped device, wherein if the movement sensor tracker provides a first signal, then the image generator generates an image of a burning end on the smoking implement shaped device combined with the live images, wherein if the movement sensor tracker provides a second signal, then the image generator generates an image of an exhalation within the viewing device combined with the live images, and/or wherein if the movement sensor tracker provides a third signal, then the image generator generates an image of a sidestream smoke emission from an end of the smoking implement shaped device combined with the live images, wherein the smoking implement shaped device includes a releasable flavorant or aroma emitting additive located in the smoking implement shaped device, and wherein a pattern and characteristics of the sidestream smoke emission are controllable based on ambient conditions in a room of the live environment, and at least one sensor for sensing the ambient conditions in the room, and wherein the ambient conditions include at least one of airflow and temperature.

2. The virtual or augmented reality smoking system of claim 1, wherein the viewing device is a head mounted display.

3. The virtual or augmented reality smoking system of claim 1, wherein the smoking implement shaped device is a cigarette model having the dimensions and appearance of a lit-end cigarette and the movement sensor tracker is located at a lit-end of the cigarette model.

4. The virtual or augmented reality smoking system of claim 1, wherein the smoking implement shaped device includes a light emitting device on an end of a hollow cylindrical device, wherein the light emitting device optionally comprises at least one light emitting diode, wherein the light emitting diode is capable of being controlled based on readings by an airflow sensor.

5. The virtual or augmented reality smoking system of claim 4, wherein the releasable flavorant comprises tobacco or tobacco smoke, the hollow cylindrical device comprises a cigarette filter capable of providing a resistance to draw (RTD) for the smoking implement shaped device, and an airflow sensor comprises a microphone.

6. The virtual or augmented reality smoking system of claim 1, wherein the movement sensor tracker is configured to detect air flow direction and force and wirelessly transmit data corresponding to the air flow direction and force to a second sensor tracker.

7. The virtual or augmented reality smoking system of claim 1, wherein the smoking implement shaped device includes a second sensor configured to detect air flow direction and force and transmit data corresponding to the air flow direction and force to a second sensor tracker.

8. The virtual or augmented reality smoking system of claim 7, wherein the smoking implement shaped device is a cigarette model having the dimensions and appearance of a lit-end cigarette and the second sensor is located at a lit-end of the cigarette model.

9. The virtual or augmented reality smoking system of claim 1, wherein the movement sensor senses a position of the smoking implement shaped device when in a user's mouth.

10. The virtual or augmented reality smoking system of claim 9, wherein the movement senses a path of movement of the smoking implement shaped device.

11. The virtual or augmented reality smoking system of claim 3, wherein the movement sensor senses a position of the smoking implement shaped device when in a user's mouth.

12. The virtual or augmented reality smoking system of claim 11, wherein the movement sensor senses a path of movement of the smoking implement shaped device.

13. The virtual or augmented reality smoking system of claim 4, wherein the movement sensor senses a position of the smoking implement shaped device when in a user's mouth.

14. The virtual or augmented reality smoking system of claim 13, wherein the movement sensor senses a path of movement of the smoking implement shaped device.

15. The virtual or augmented reality smoking system of claim 6, wherein the movement sensor senses a position of the smoking implement shaped device when in a user's mouth.

16. The virtual or augmented reality smoking system of claim 15, wherein the movement sensor senses a path of movement of the smoking implement shaped device.

* * * * *